(12) United States Patent
Otte et al.

(10) Patent No.: US 9,981,561 B2
(45) Date of Patent: May 29, 2018

(54) OVERVOLTAGE PROTECTION FOR A MOTOR VEHICLE ELECTRICAL SYSTEM IN THE EVENT OF A LOAD DUMP

(71) Applicant: SEG AUTOMOTIVE GERMANY GMBH, Stuttgart (DE)

(72) Inventors: Christopher Otte, Reutlingen (DE); Paul Mehringer, Stuttgart (DE); Wolfgang Feiler, Reutlingen (DE)

(73) Assignee: SEG Automotive Germany GmbH, Stuttgart (DE)

( * ) Notice: Subject to any disclaimer, the term of this patent is extended or adjusted under 35 U.S.C. 154(b) by 24 days.

(21) Appl. No.: 15/034,162

(22) PCT Filed: Nov. 7, 2014

(86) PCT No.: PCT/EP2014/074027
§ 371 (c)(1),
(2) Date: May 3, 2016

(87) PCT Pub. No.: WO2015/071186
PCT Pub. Date: May 21, 2015

(65) Prior Publication Data
US 2016/0257206 A1    Sep. 8, 2016

(30) Foreign Application Priority Data
Nov. 15, 2013 (DE) .......................... 102013223316.7

(51) Int. Cl.
*B60L 11/02* (2006.01)
*H02H 7/06* (2006.01)
(Continued)

(52) U.S. Cl.
CPC ............... *B60L 11/02* (2013.01); *B60L 11/18* (2013.01); *H02H 7/067* (2013.01);
(Continued)

(58) Field of Classification Search
CPC ......... B60L 11/02; B60L 11/18; H02M 7/219; H02M 1/32; H02M 2001/325; H02H 7/067; H02H 7/1252
See application file for complete search history.

(56) References Cited

U.S. PATENT DOCUMENTS

| | | | |
|---|---|---|---|
| 4,831,322 | A | 5/1989 | Mashino et al. |
| 6,504,315 | B2 | 1/2003 | Kim |

(Continued)

FOREIGN PATENT DOCUMENTS

| | | |
|---|---|---|
| DE | 3815842 A1 | 11/1988 |
| DE | 19835316 | 2/2000 |

(Continued)

OTHER PUBLICATIONS

DsPIC33F/PIC24H Family Reference Manual, Section 45. High-Speed Analog Comparator, 45.4.7., Microchip Technology Inc., (2007-2012), pp. 45-1-45-18.

(Continued)

*Primary Examiner* — Jung Kim
(74) *Attorney, Agent, or Firm* — Norton Rose Fulbright US LLP; Gerard Messina, Esq.

(57) ABSTRACT

A motor vehicle electrical system which includes an electric machine, an active bridge rectifier, and at least one control device, the at least one control device being configured for converting an alternating voltage which is output by the electric machine at a number of phase connections into a direct voltage by controlling active switching elements of the bridge rectifier. An arrangement is provided configured for initiating a short circuit of at least two of the phase connections as soon as a signal characterizing the direct voltage exceeds an upper threshold value, and for deactivating the short circuit as soon as the signal characterizing the direct voltage subsequently falls below a lower threshold value. An evaluation device is provided configured for (Continued)

detecting a value of the direct voltage, for filtering the detected value, and for providing the filtered value as the signal characterizing the direct voltage.

8 Claims, 10 Drawing Sheets

(51) Int. Cl.
  *H02H 7/125* (2006.01)
  *H02M 7/219* (2006.01)
  *B60L 11/18* (2006.01)
  *H02M 1/32* (2007.01)

(52) U.S. Cl.
  CPC ............ *H02H 7/1252* (2013.01); *H02M 1/32* (2013.01); *H02M 7/219* (2013.01); *H02M 2001/325* (2013.01)

(56) References Cited

U.S. PATENT DOCUMENTS

| | | | |
|---|---|---|---|
| 6,703,718 B2 | 3/2004 | Calley et al. | |
| 6,803,748 B2* | 10/2004 | Peter | H02H 7/067 322/17 |
| 6,831,445 B2 | 12/2004 | Taniguchi | |
| 6,894,882 B2 | 5/2005 | Maru et al. | |
| 8,294,412 B2 | 10/2012 | Chenin | |
| 2001/0020803 A1 | 9/2001 | Maru et al. | |
| 2002/0030456 A1 | 3/2002 | Kim | |
| 2003/0071467 A1 | 4/2003 | Calley et al. | |
| 2003/0107350 A1 | 6/2003 | Taniguchi | |
| 2004/0150376 A1 | 8/2004 | Peter | |
| 2005/0179501 A1* | 8/2005 | Natonio | H03L 7/099 331/16 |
| 2010/0201304 A1 | 8/2010 | Chenin | |
| 2016/0124029 A1* | 5/2016 | Gobbi | G01R 19/16557 320/166 |

FOREIGN PATENT DOCUMENTS

| | | |
|---|---|---|
| DE | 102009046955 | 5/2011 |
| DE | 10 2011 051 642 A1 | 3/2012 |
| EP | 1198048 | 4/2002 |
| FR | 2975241 | 11/2012 |
| JP | 2007300709 A | 11/2007 |
| JP | 2011-030361 A | 2/2011 |
| JP | 2011078216 A | 4/2011 |
| JP | 2011109433 A | 6/2011 |
| JP | 2011190734 A | 9/2011 |
| WO | WO 2009/093101 | 7/2009 |

OTHER PUBLICATIONS

International Search Report dated Jan. 20, 2015 of the corresponding International Application PCT/EP2014/074027 filed Nov. 7, 2014.

* cited by examiner

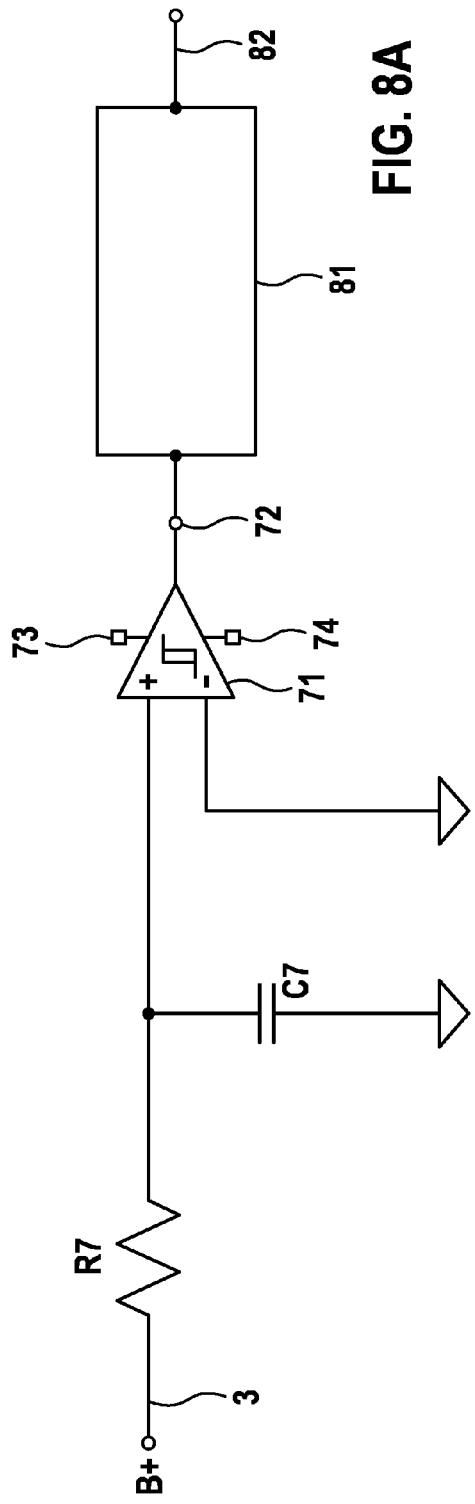
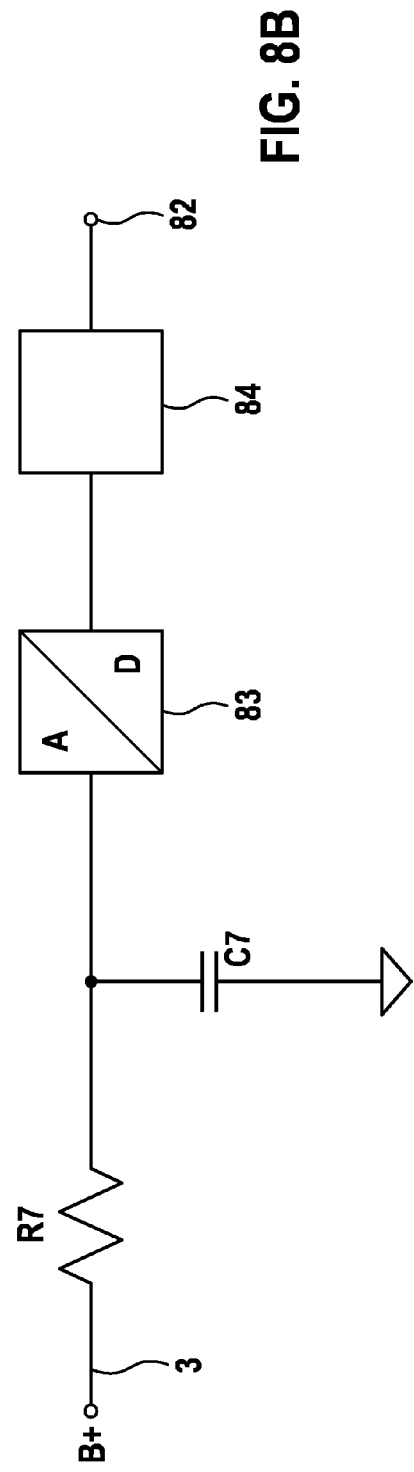
FIG. 8A
FIG. 8B

OVERVOLTAGE PROTECTION FOR A MOTOR VEHICLE ELECTRICAL SYSTEM IN THE EVENT OF A LOAD DUMP

FIELD

The present invention relates to a motor vehicle electrical system, a method, and an arrangement for implementing the method.

BACKGROUND INFORMATION

Rectifiers of various designs may be used for feeding direct current systems out of three-phase current systems, of motor vehicle electrical systems, for example, using three-phase current generators. Bridge rectifiers having a six-, eight-, or ten-pulse design are used in motor vehicle electrical systems, corresponding to the three-, four-, or five-phase current generators which are usually installed. However, the present invention is also suitable for bridge rectifiers having other numbers of phases.

When reference is made below to a generator for the purpose of simplicity, this may also be an electric machine which is operable in a generator mode and a motor mode, for example a starter generator.

A so-called load dump is a critical operating condition in bridge rectifiers. A load dump occurs when, for a highly excited generator and a correspondingly high delivered current, the load on the generator or the bridge rectifier connected thereto suddenly decreases, for example by disconnecting consumers. As a result of the energy which continues to be delivered by the generator, high voltages occur for approximately 300 ms to 500 ms. If it is not possible to intercept or completely intercept these high voltages by capacitively acting elements in the direct voltage network (for example, the motor vehicle battery) or in the rectifier, components in the motor vehicle electrical system may be damaged due to overvoltages.

In conventional (passive) bridge rectifiers, a certain amount of protection is provided by the rectifier itself, namely, with the aid of the rectifier Zener diodes, installed there in the classical case, in which the overvoltage may be arrested and the excess energy may be converted into heat.

However, as described in German Patent Application No. DE 10 2009 046 955 A1, for example, the use of active or controlled bridge rectifiers is desirable in motor vehicles. This is the case, among other reasons, due to the fact that active bridge rectifiers, in contrast to passive or uncontrolled bridge rectifiers, have lower power losses during normal operation. However, presently available controllable or active switching elements for such active bridge rectifiers, for example MOSFETs, have no integrated arresting function with sufficient robustness, as is the case for conventional rectifier Zener diodes, and therefore are not able to intercept the overvoltage. For this reason, additional protective strategies are necessary in active bridge rectifiers.

During a load dump, the generator phases for example may be short-circuited by temporarily conductively connecting some or all switching elements of the upper or lower rectifier branch of a corresponding rectifier, for example as also described in German Patent Application No. DE 198 35 316 A1 and German Patent Application No. DE 10 2009 046 955 A1. This takes place in particular on the basis of an evaluation of the output voltage present at the direct voltage terminals of the active bridge rectifier. If the output voltage exceeds a predefined upper threshold value, a corresponding short circuit is initiated and the output voltage drops. If the output voltage subsequently falls below a predefined lower threshold value, the short circuit is eliminated and the output voltage rises again. Therefore, this is typical hysteresis behavior. Thus, during a load dump the output voltage oscillates between the upper and the lower threshold value.

Problems may thus arise here, since the mentioned switching operations, i.e., repeating phase short circuits, result in heavy stress on the involved switching elements. This may damage the switching elements when they are not appropriately dimensioned.

Therefore, there is a need for improved protective strategies for active bridge rectifiers in the event of a load dump.

SUMMARY

Against this background, the present invention provides a motor vehicle electrical system, a method, and an arrangement for implementing the method. Advantageous embodiments are the described below.

The present invention is directed to a motor vehicle electrical system which includes an electric machine, an active bridge rectifier, and at least one control device. As is customary in this regard, the at least one control device is configured for converting an alternating voltage which is output by the electric machine at a number of phase connections into a direct voltage by controlling active switching elements of the bridge rectifier. In addition, an arrangement is provided which is configured for initiating a short circuit of at least two of the phase connections as soon as a signal characterizing the direct voltage exceeds an upper threshold value, and for eliminating the short circuit as soon as the signal characterizing the direct voltage subsequently falls below a lower threshold value.

This type of motor vehicle electrical system or an electric machine together with a bridge rectifier and a control device of such a motor vehicle electrical system is explained in greater detail below with reference to FIG. 2.

According to the present invention, it is provided to equip such a motor vehicle electrical system or the control device thereof with evaluation element which is configured for detecting a value of the direct voltage which is output by the active bridge rectifier. As explained above, such a value is detected even in conventional motor vehicle electrical systems, and on this basis a determination is made as to whether a load dump occurs.

However, according to the present invention, it is also provided to filter the detected value and to provide the filtered value as the signal characterizing the direct voltage. As explained below and in particular shown with reference to FIGS. 3 through 5, the measures according to the present invention allow high-frequency repetitive switchover operations between a short circuit and an eliminated short circuit to be avoided. The active switching elements of a corresponding bridge rectifier are exposed to less stress due to use of the measures according to the present invention.

In other words, the undesirable activation and deactivation of the phase short circuit, which typically take place in rapid succession, due to the voltage peaks of the voltage signal output by the active bridge rectifier in each case rising above and falling below the trigger thresholds used, are prevented in that a voltage signal is filtered with an appropriately adapted filter, and/or an adaptive control of trigger thresholds of a corresponding comparator, which is part of the mentioned evaluation element, takes place. A significant advantage of the measures provided according to the present invention is the avoidance of frequent switching operations in the active switching elements used, for example the MOSFETs installed in an active bridge rectifier, which could result in intense, possibly damaging stress. The installed switching elements may therefore have a smaller, more cost-effective design.

The present invention may include all suitable filters. In the following discussion, reference is made primarily to conventional RC filters, glitch filters, and/or switched capacitor (SC) filters, which in the context of the present patent application have proven to be particularly advantageous.

In particular, in this regard at least one resonant frequency of the vehicle electrical system is taken into account, and filtering of the mentioned signal is carried out on this basis. In this regard, an important aspect is the emulation of the pattern of the vehicle electrical system voltage by using a filter, having a defined limiting frequency, between the direct voltage which is output by the active bridge rectifier and a comparator block, which makes decisions concerning the deactivation and activation of the phase short circuit via suitable trigger thresholds.

Within the scope of the present invention, a comparator having a settable comparator threshold may also be used in a particularly advantageous manner. If the comparator threshold is set to an upper value, this value may correspond to the upper threshold value. Similarly, if the comparator threshold is set to a lower value, this value may correspond to the lower threshold value. To prevent undesirably frequent switching operations, in particular it may also be provided to lower the lower threshold value for a predetermined time period as soon as the signal characterizing the direct voltage exceeds the upper threshold value, or to raise the upper threshold value for a predetermined time period as soon as the signal characterizing the direct voltage subsequently exceeds the lower threshold value. This avoids the situation in which the mentioned signal crosses a particular threshold value multiple times within the indicated time period, thus resulting in switching of the involved active switching elements. Instead of lowering or raising a particular value of the comparator threshold, it may also be provided to virtually deactivate the particular threshold values in some other way, if such a comparator is designed for such an operation. The aim in each case is to avoid crossing of a particular threshold value during a predetermined time period, which is selected based on characteristics of the particular vehicle electrical system, for example based on resistance, inductance, and capacitance values.

A processing unit according to the present invention, such as a control unit of a motor vehicle, is configured, in particular by programming, for carrying out a method according to the present invention.

In addition, the implementation of the method in the form of software is advantageous, since this entails particularly low costs, in particular when an executing control unit may also be used for other tasks, and therefore is present anyway. Suitable data carriers for providing the computer program are in particular diskettes, hard drives, flash memories, EEPROMs, CD-ROMs, DVDs, and others. In addition, downloading a program via computer networks (Internet, intranet, etc.) is possible.

Further advantages and embodiments of the present invention result from the description and the appended drawings.

It is understood that the features mentioned above and to be explained below may be used not only in the particular stated combination, but also in other combinations or alone without departing from the scope of the present invention.

The present invention is schematically illustrated in the figures based on exemplary embodiments, and is described in greater detail below with reference to the figures.

BRIEF DESCRIPTION OF THE DRAWINGS

FIG. 8 shows in subfigures 8A and 8B measures for filtering a voltage signal according to one specific embodiment of the present invention, in a schematic illustration.

DETAILED DESCRIPTION OF EXAMPLE EMBODIMENTS

Figure 1:
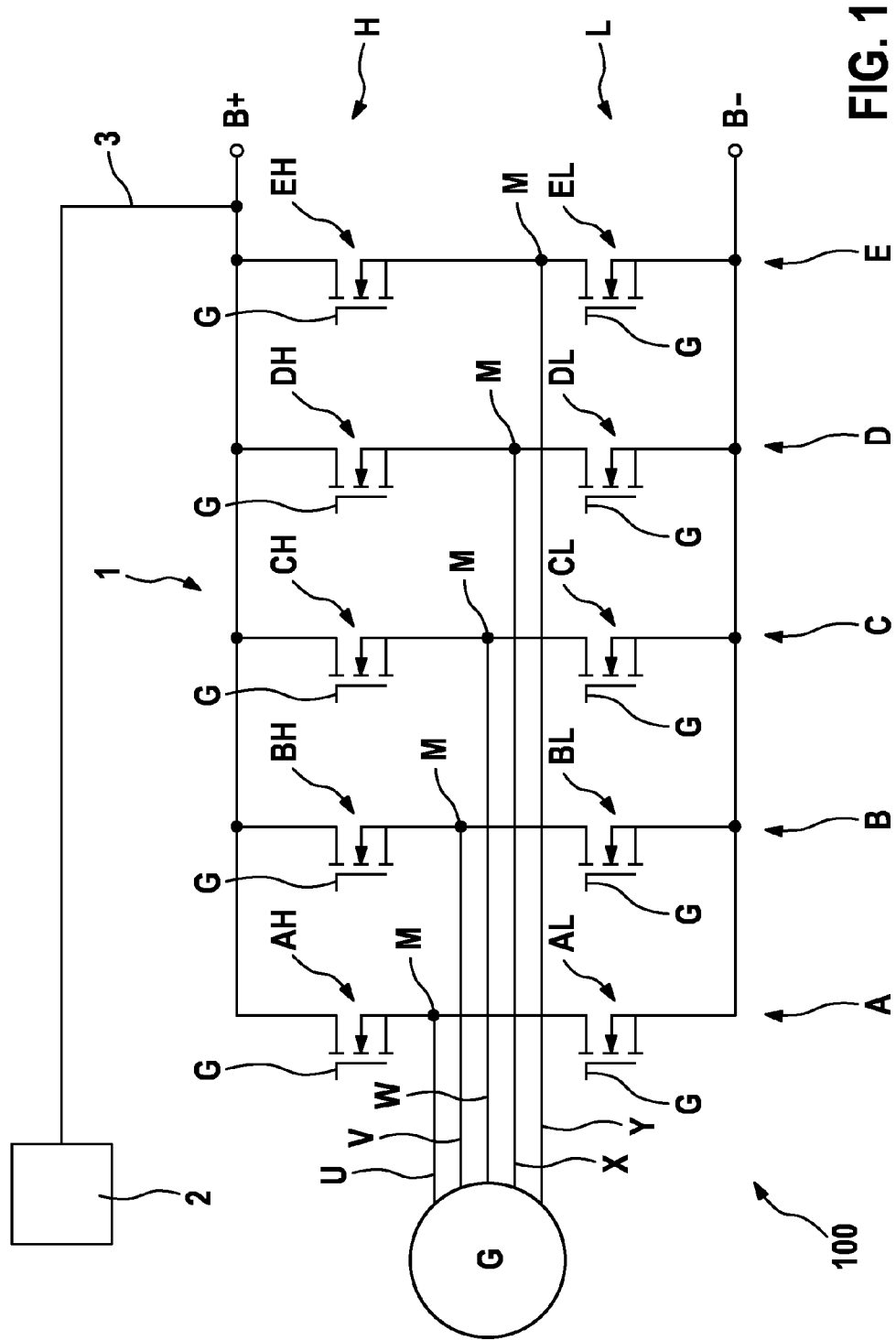
FIG. 1 shows a vehicle electrical system which includes a bridge rectifier, a generator, and a control device, in a schematic partial illustration.

FIG. 1 schematically illustrates a conventional system which includes a bridge rectifier 1 and a generator G, using the example of a five-phase system. Bridge rectifier 1 is illustrated in FIG. 1 as a ten-pulse bridge rectifier which is configured for rectifying a three-phase current of a five-phase generator G. However, a three-, four-, six-, or seven-phase generator G and a correspondingly adapted six-, eight-, twelve-, or fourteen-pulse bridge rectifier 1, for example, may similarly also be used. Bridge rectifier 1 is part of a vehicle electrical system 100, which is only partially illustrated here.

Bridge rectifier 1 has five half bridges A through E, which are respectively connected via their center tap M to the five generator phases or corresponding phase connections U through Y.

Half bridges A through E are each connected at their ends to direct voltage terminals B+ and B−, for example battery terminals and/or corresponding supply lines of a vehicle electrical system 100. Terminal B− may be connected to ground.

Half bridges A through E each include active switching elements AH through EH and AL through EL, which are depicted here as MOSFETs. These are respectively integrated into an upper branch H (high-side) and a lower branch L (low-side) of individual half bridges A through E.

Phase connections U through Y may each be connected to one of the two direct voltage terminals B+ or B− according to an appropriate wiring of active switching elements AH through EH and AL through EL. When two or more phase connections U through Y are in each case connected to the same direct voltage terminal B+ or B−, this is equivalent to a short circuit of these phase connections U through Y via respective direct voltage terminal B+ or B−.

Active switching elements AH through EH and AL through EL are wired via their respective gate terminals G by a control device 2 via control lines, not illustrated. A single control device 2 may be provided for all half bridges A through E. Alternatively, each half bridge A through E may also have its own control device. In the latter case, functions may be arbitrarily distributed between individual control devices and a shared control device 2.

The normal operation of the generator includes controlling active switching elements AH through EH and AL through EL in such a way that current signals present at phase connections U through Y are "shot through" to B+ and B− in alternation, depending on the current direction, as is conventional.

In a system illustrated in FIG. 1, a load dump may be detected based on a voltage that is present at direct voltage terminal B+. For this purpose, control device 2 is connected to direct voltage terminal B+ via a line 3. A load dump is occurring when a defined voltage threshold value is exceeded.

When a load dump is detected, the control of rectifier 1 may include temporarily short-circuiting phase connections U through Y in a defined manner. As a result, the current fed to the vehicle electrical system drops to zero, and the voltage detected across line 3 drops. Such a short circuit may be created by simultaneously controlling, and thus conductively connecting, some or all switching elements AH through EH on the one hand or AL through EL on the other hand, i.e., some or all switching elements of a rectifier branch H or L, respectively. When such a short circuit is deactivated, the current fed to the vehicle electrical system and the voltage detected across line 3 rise once again.

Figure 2:
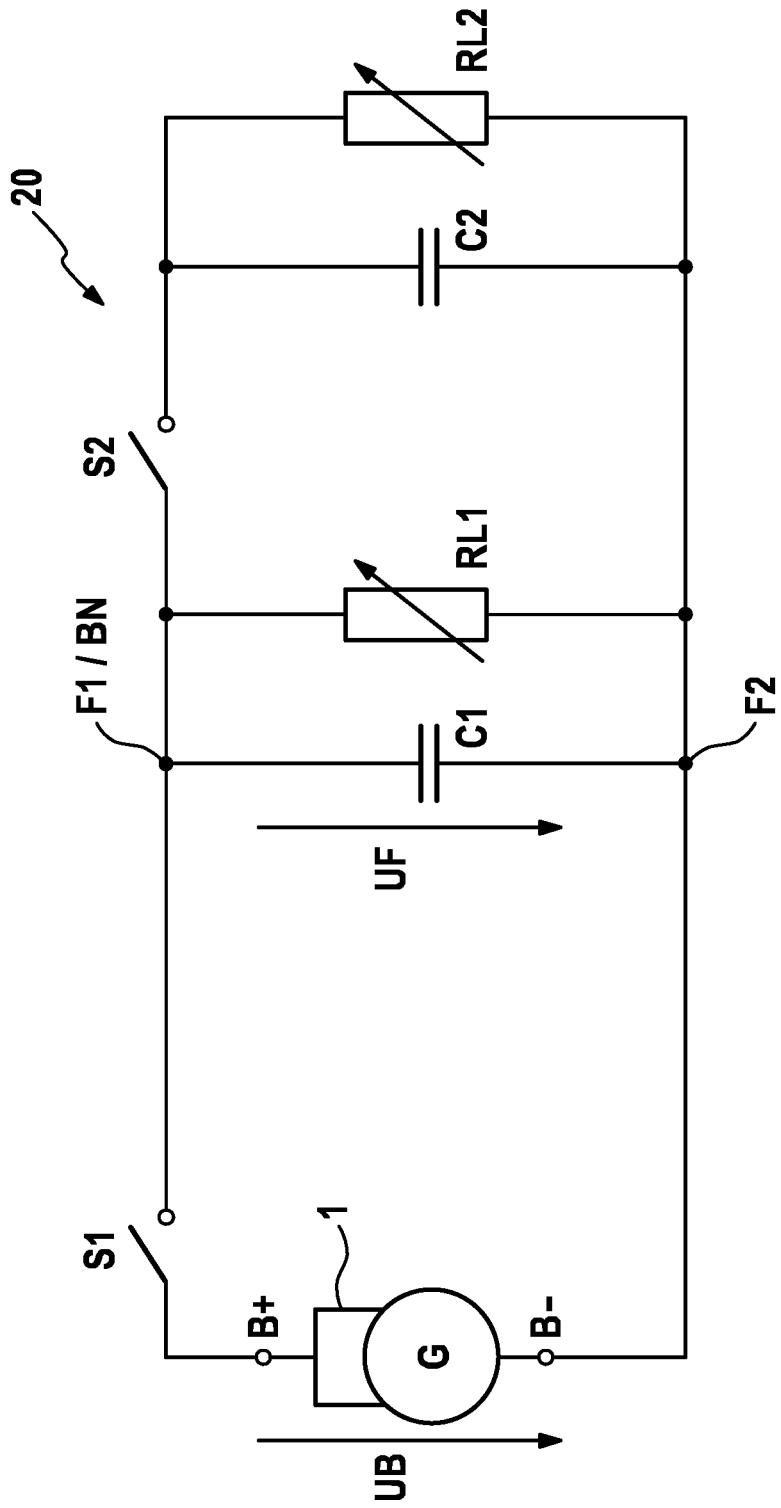
FIG. 2 shows a system for simulating load dumps in a vehicle electrical system, in a schematic illustration.

FIG. 2 illustrates a circuit, denoted overall by reference numeral 20, for simulating load dumps in a vehicle electrical system of a motor vehicle. At the same time, circuit 20 represents an equivalent circuit diagram of a vehicle electrical system into which a generator G and a rectifier 1, for example as illustrated in FIG. 1 described above, are integrated. As described, such a vehicle electrical system may also include generators G and/or rectifiers 1 having a different number of phases or pulses.

A voltage UB is present at generator G together with rectifier 1, as depicted by an appropriately inscribed arrow. Capacitors C1 and C2 and load resistors RL1 and RL2 represent capacitors and resistors, respectively, of an actual vehicle electrical system. Capacitor C1 corresponds to a capacitor at a jump start assistance point, which is provided for jump starting the motor vehicle in question. Terminals F1 and F2 are provided for starting assistance. At a point BN, which may correspond to terminal F1, a vehicle electrical system voltage may be measured, for example against ground or terminal F2. Capacitor C1 is provided, among other things, for buffering voltage fluctuations in the vehicle electrical system. The voltage dropping across capacitor C1 is likewise depicted by an arrow, and is denoted by reference character UF.

It is pointed out that in customary motor vehicles, generator G together with rectifier 1 on the one hand and capacitor C1 on the other hand, or also point BN or terminals F1 and F2, are separated from one another by lines having a length of typically 1.5 to 2 meters and a cross section of 25 square millimeters, for example. In contrast, in the following discussion the direct voltage terminals of the rectifier, B+ and B− are regarded as terminals which are provided directly at the rectifier. For example, terminals F1 and F2 and point BN, as explained, are separated therefrom by corresponding line lengths.

The described lines having the stated properties generally correspond to inductances in the electrical equivalent circuit diagram. These inductances are responsible for voltage peaks resulting during rapid current changes at direct voltage terminals B+ and B− of rectifier 1. The voltages at the jump start assistance point, i.e., voltage UF, which drops against ground between terminals F1 and F2 or point BN, therefore cannot be detected directly by an electronics system mounted on generator G or rectifier 1. The present invention also takes this into account.

When reference is made below to "voltages at the rectifier," this involves voltages which may be measured directly at rectifier 1, i.e., at terminal B+, for example. These voltages are also denoted by reference character V(B+). Due to the described inductances of the lines, the time curves of these voltages may possibly differ from the time curves of "voltages at the vehicle electrical system," which may be measured at terminal F1 or point BN, for example, and which are denoted by reference character V(BN).

Switches S1 and S2 are provided for simulation of load dumps. At the start of a load dump test or a corresponding simulation, both switches S1 and S2 are closed. Generator G or rectifier 1 delivers a current, which results from load resistors RL1 and RL2, to the vehicle electrical system. A load dump may be simulated by opening one of switches S1 or S2. Opening of switch S1 thus corresponds to a load drop to 0%, which in reality would be caused, for example, by the drop on the connecting cable at the generator. In contrast, opening switch S2 simulates a partial load drop which is caused by switching off a fairly large resistive load, RL2 in the present case, in the vehicle electrical system. The value of the "dumped" load current may be adjusted via the resistance value of load resistor RL2, and the value of the residual vehicle electrical system current may be adjusted via the resistance of load resistor RL1.

Figure 3:
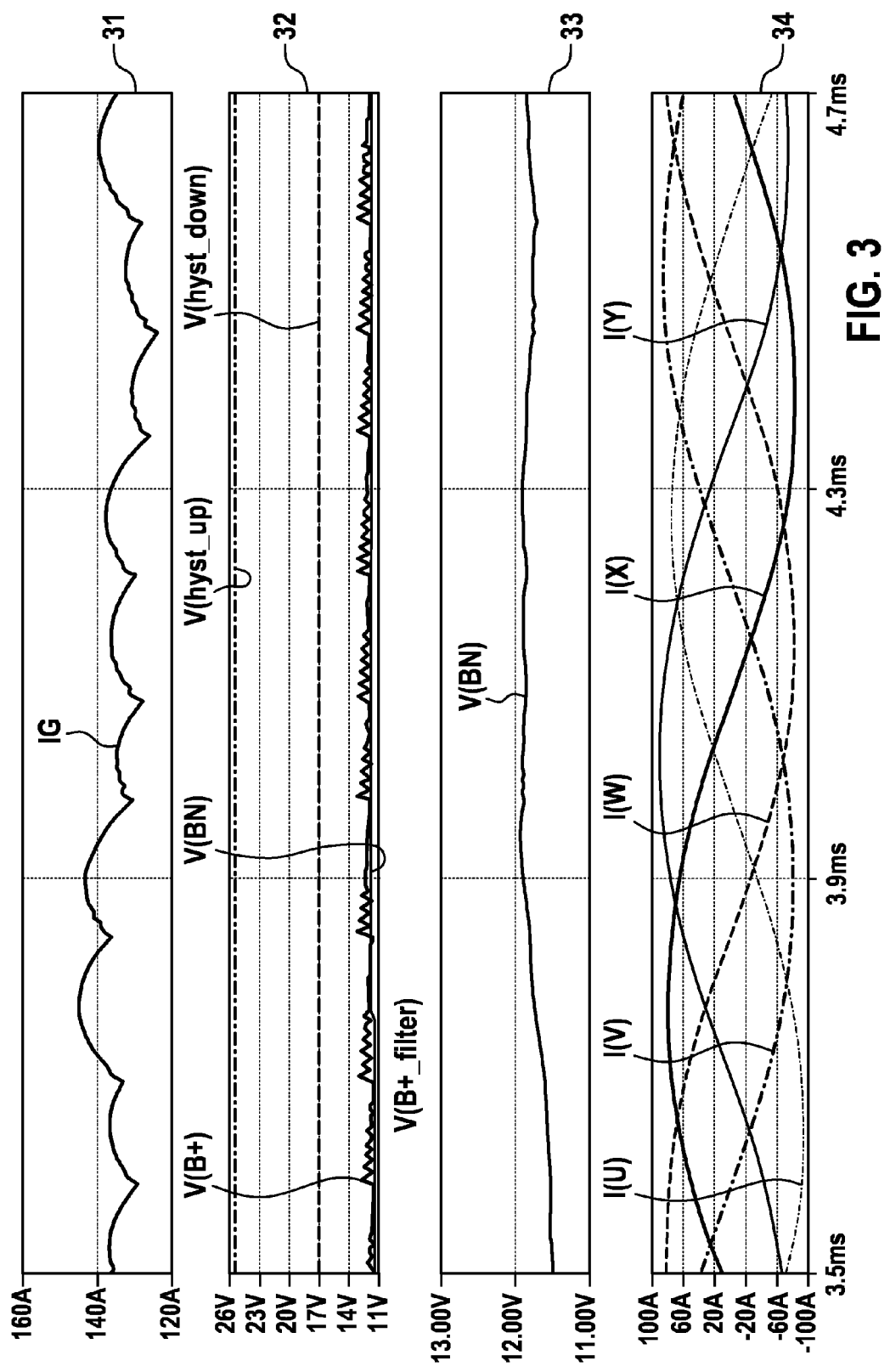
FIG. 3 shows current and voltage patterns during active rectification in a vehicle electrical system according to the related art, in the form of diagrams.
Figure 4A:
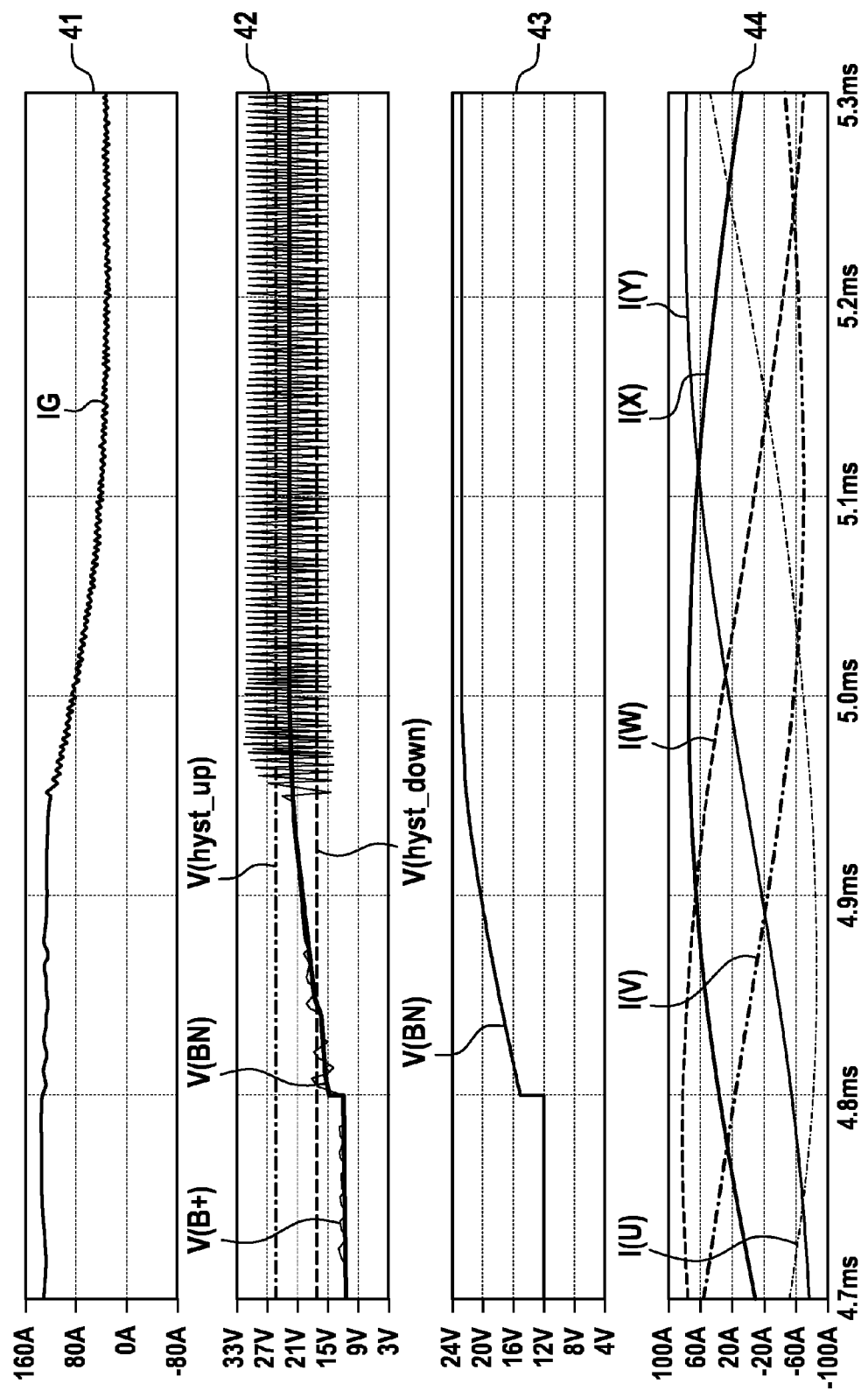
FIG. 4 shows current and voltage patterns in a vehicle electrical system in the event of a load dump according to the related art, in the form of diagrams.
Figure 4B:
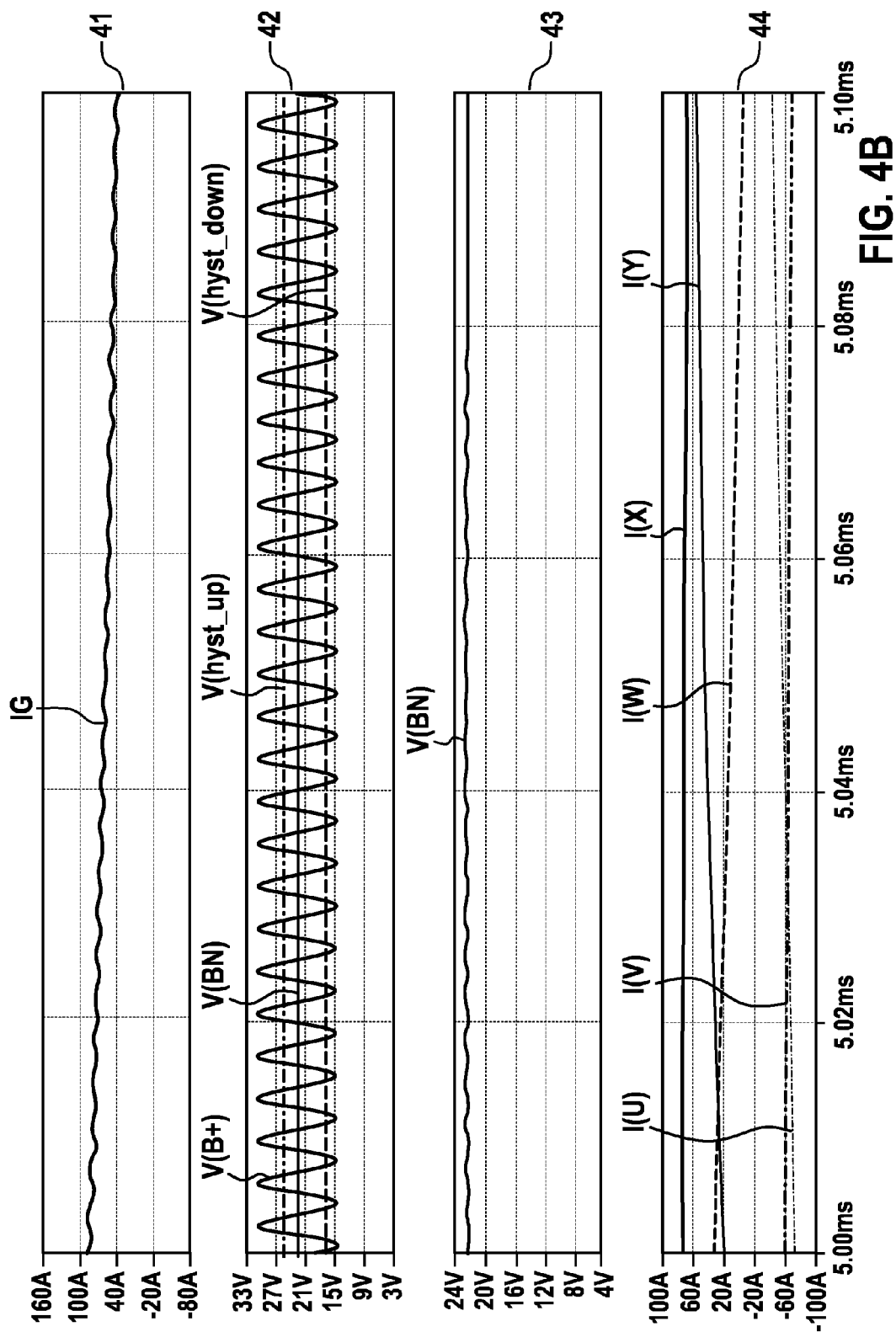
Figure 5:
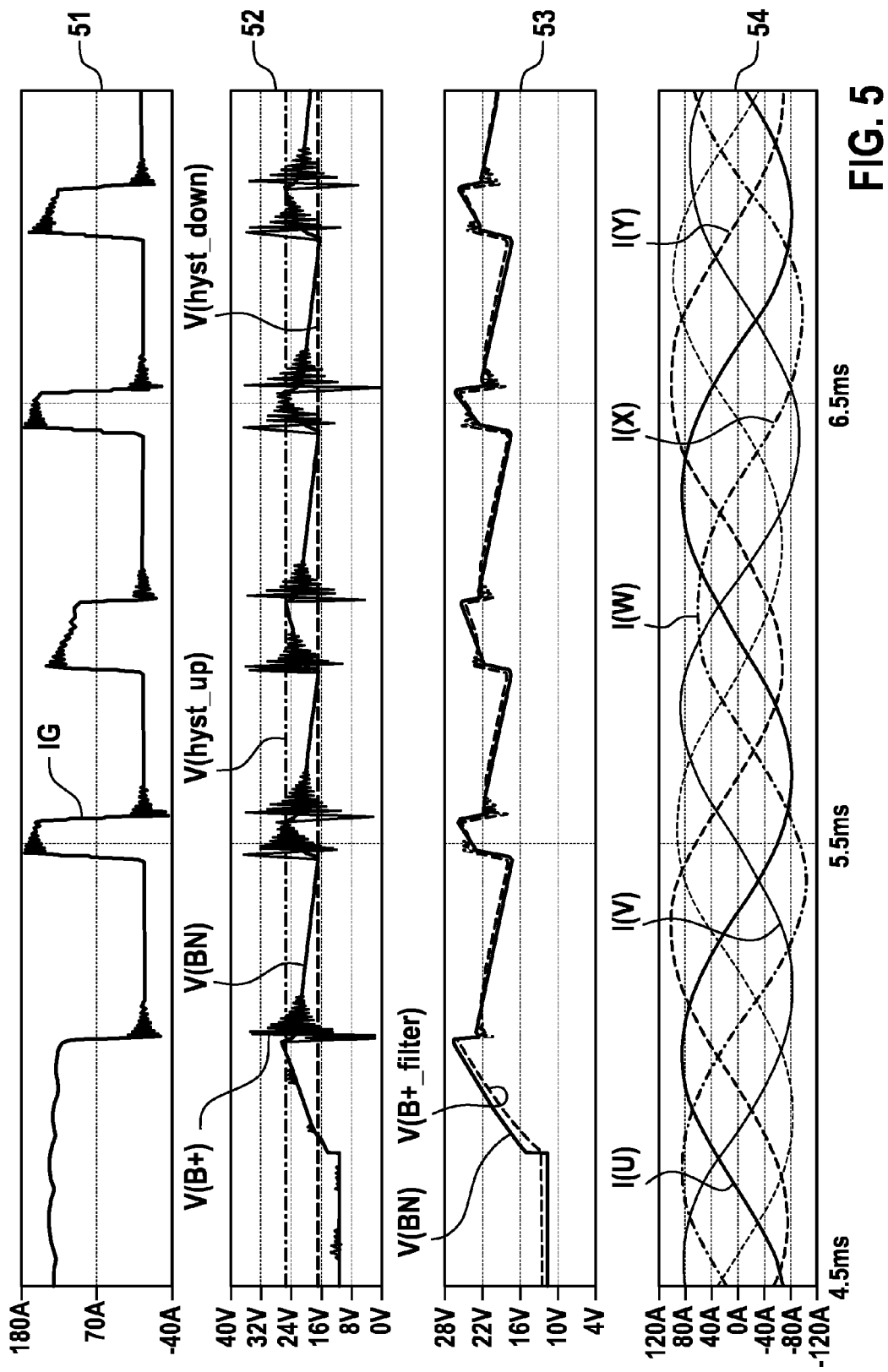
FIG. 5 shows current and voltage patterns in a vehicle electrical system in the event of a load dump according to one specific embodiment of the present invention, in the form of diagrams.

FIGS. 3 through 5 each show four diagrams of current and voltage patterns in generators G or rectifiers 1 operated conventionally and according to the present invention, during normal operation (FIG. 3) and during a load dump (FIGS. 4 and 5). The particular current and voltage patterns are plotted as V and A, respectively, on the ordinate as a function of time in ms on the abscissa. The current and voltage patterns are denoted identically in FIGS. 3 through 5. Current and voltage patterns of a five-phase generator G and of a corresponding ten-pulse rectifier 1 are depicted in each case. As described, the present invention may also be used with a different number of phases or pulses. In FIGS. 3 through 5, phases U through Y correspond, for example, to phases U through Y illustrated in FIG. 1.

The delivered generator current is denoted by reference character IG, and the voltage at the positive voltage terminal of the rectifier or B+, as illustrated in FIGS. 1 and 2, is denoted by reference character V(B+). The resulting voltage in the vehicle electrical system, which may be measured, for example, at terminal F1 of the jump start assistance point or point BN in FIG. 2, is denoted by reference character V(BN). The upper voltage limit, i.e., a corresponding threshold value for activating a phase short circuit, is denoted by reference character V(hyst_up). As mentioned, a voltage value at positive direct voltage terminal B+ is detected via a line 3 and compared to a corresponding value V(hyst_up), for example in a system illustrated in FIG. 1. Similarly, the lower voltage limit, i.e., a corresponding threshold value for deactivating a phase short circuit, is denoted by reference character V(hyst_down). The phase currents in phases U through Y (see FIG. 1) are denoted by reference characters I(U) through I(Y), respectively.

FIG. 3 shows current and voltage patterns during routine operation of such a system made up of a generator G and a rectifier 1 in a vehicle electrical system. It is apparent that only slight differences occur between the values for V(B+) and V(BN) (see diagram 32). Threshold values V(hyst_up) and V(hyst_down) are not reached. Voltage V(BN) at vehicle electrical system (see diagram 33) consistently varies between 11 V and 12 V. Brief disturbances occur at the positive direct voltage terminal, and thus in voltage V(B+), only at the zero crossings of the phase currents (see diagram 34 in conjunction with diagram 32), and result in a voltage difference between V(B+) and V(BN). However, these disturbances do not reach the vehicle electrical system, and therefore voltage V(BN) shows hardly any irregularities. Generator current IG (see diagram 31) varies between 120 A and 160 A.

FIGS. 4A and 4B illustrate a load dump at approximately 4.8 ms. FIG. 4B represents a detail enlargement of FIG. 4A. As is apparent from diagram 42 in FIG. 4A, beginning at this point in time there is a distinct increase in the value of V(B+). At approximately 4.95 ms, the value of V(B+) reaches threshold value V(hyst_up) for the first time. As described, beginning at this point in time protective measures are initiated which include short-circuiting of some or all generator phases U through Y by simultaneously controlling some or all switching elements in upper or lower rectifier branch H or L, respectively, of rectifier 2 (see description for FIG. 1). As a result, the voltage value at V(B+) drops, and falls below lower threshold value V(hyst_down). Similarly, when the phase short circuit is eliminated, the voltage rises once again and exceeds upper threshold value V(hyst_up), which once again causes a short circuit. This results in high-frequency (>50 kHz, for example) repeating phase short circuits, as are apparent in particular from diagram 42 in FIG. 4B. Due to the inductances in the installed lines, for example between B+ and terminal F1 or point BN in FIG. 2, a voltage change occurs at B+ on account of the rapid current changes according to ΔU=L×dI/dt. In contrast, voltage V(BN) at vehicle electrical system, for example voltage UF in FIG. 2, remains at a virtually fixed value.

As described, the activation and deactivation, occurring in rapid succession, of the phase short circuit due to the voltage peaks at direct voltage terminal B+ exceeding or falling below the trigger thresholds are undesirable, and should be prevented.

This is achieved according to the present invention by filtering voltage V(B+), i.e., the voltage detected, for example, on line 3 in FIG. 1, and/or by adaptively controlling the trigger thresholds, i.e., the values of V(hyst_up) and V(hyst_down). An important aspect of the present invention is the emulation of the pattern of vehicle electrical system voltage V(BN) by using a filter having a defined limiting frequency between V(B+) and a comparator block, which with the aid of mentioned trigger thresholds V(hyst_down) and V(hyst_up) decides on the deactivation and activation of the phase short circuit. According to the present invention, an RC filter, a digital filter, and/or a switched capacitor (SC) filter, for example, may be provided, as illustrated in detail in FIG. 7 and subfigures 8A and 8B of FIG. 8. The results of the measures according to the present invention are depicted in FIG. 5.

FIG. 5 additionally illustrates an appropriately prefiltered voltage V(B+_filter) in diagram 53. As is apparent from diagram 53, this filtered signal tracks vehicle electrical system voltage V(BN) with sufficient accuracy. Voltage curve V(BN) is thus emulated, in a manner of speaking, by filtering V(B+). The high-frequency switching operations, which are apparent in FIGS. 4A and 4B and which result in a large power loss load on the involved switching elements AH through EH and AL through EL, may thus be avoided.

Figure 6:
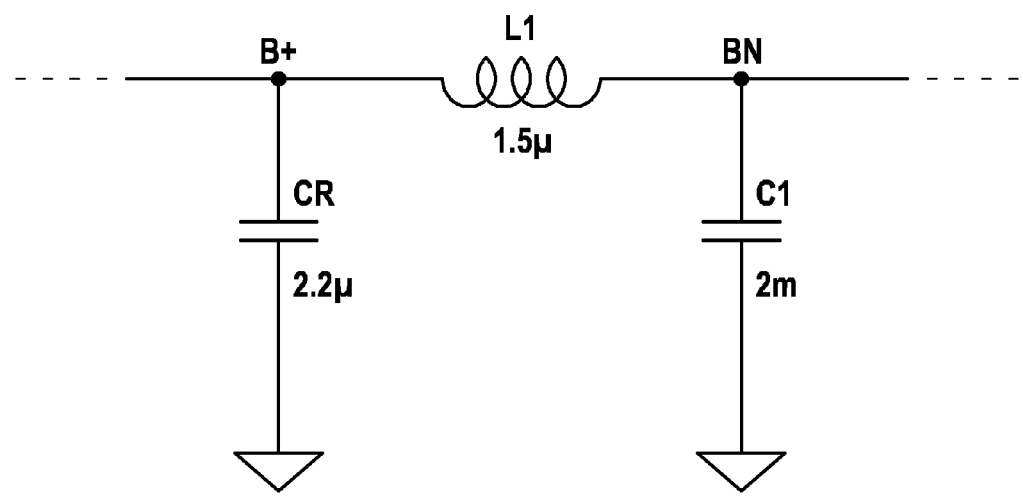
FIG. 6 shows capacitances and inductances in a vehicle electrical system in the form of a schematic equivalent circuit diagram, with values by way of example.

Dimensioning of a filter to be used is depicted by way of example, with reference to FIG. 6. The capacitively and inductively acting elements illustrated in FIG. 2 are shown once more, in detail. A capacitor which is also generally installed in a generator controller is denoted by reference character CR. A capacitor at the jump start assistance point, as already described for FIG. 2, is denoted by reference character C1. The line length between direct voltage terminal B+ at rectifier 1 and terminal F1 or BN at the jump start assistance point is depicted here as inductor L1. In the illustrated example, B− is at ground, and is not illustrated in greater detail. The illustrated values are strictly by way of example, and depend on the specific configuration of the vehicle electrical system.

Two resonant frequencies may be determined, namely, FE and FA at the input and the output, respectively, of a corresponding line:

$$FE = \frac{1}{2\pi\sqrt{CR \times L1}} \quad (1)$$

$$FA = \frac{1}{2\pi\sqrt{C1 \times L1}} \quad (2)$$

Limiting frequency FC for an RC filter is thus a function of the values of the corresponding variables in FIG. 6, the flowing currents, and the hysteresis thresholds. For emulation of V(BN), the limiting frequency should typically be selected in such a way that the following are valid:
1. FC<<FE, and
2. FC>FA
where $$FC = \frac{1}{2\pi RC} \quad (3)$$

Figure 7:
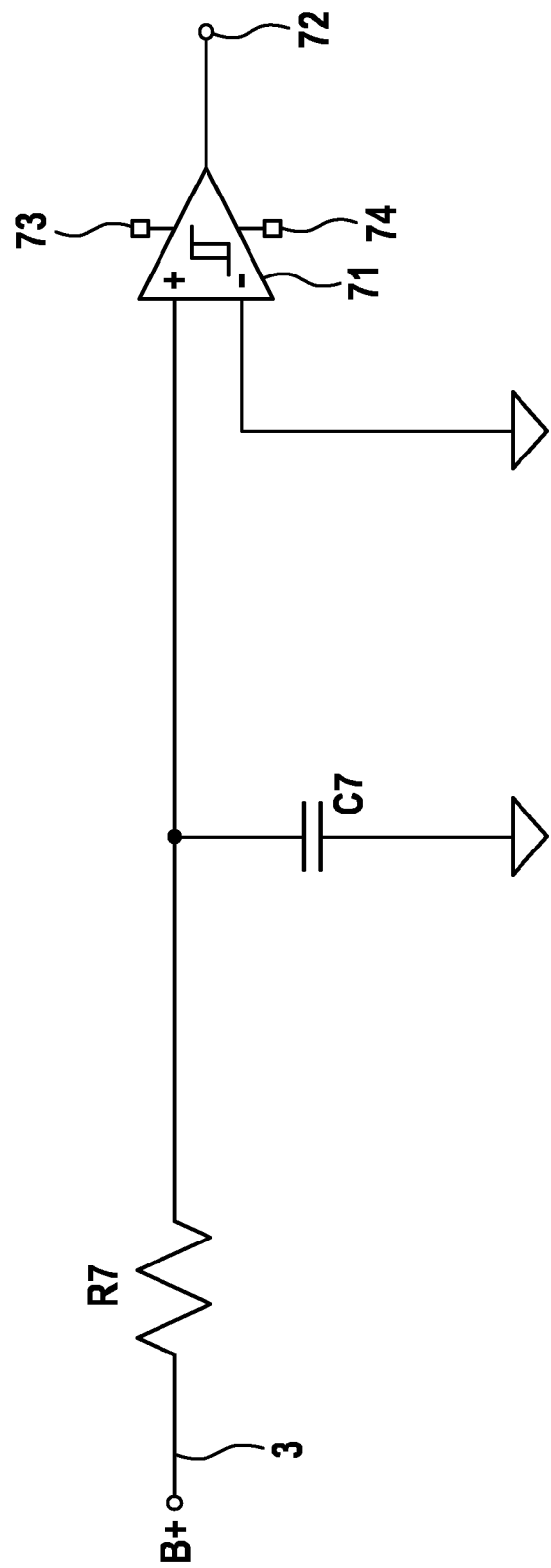
FIG. 7 shows measures for filtering a voltage signal according to one specific embodiment of the present invention, in a schematic illustration.

FIG. 7 depicts corresponding filtering via an RC filter. A value for the voltage at B+, detected via a line 3 (see FIG. 1), for example, is smoothed across a resistor R7 and a capacitor C7 before it is supplied to a comparator 71. A signal is provided at an output 72 of comparator 71 when it is recognized that filtered voltage V(B+ filter), which is supplied to comparator 71, meets certain criteria. For example, appropriate hysteresis thresholds may be predefined via inputs 73 and 74.

Subfigures 8A and 8B in FIG. 8 show signal filtering which is expanded compared to FIG. 7, in each case digitally.

According to subfigure 8A, a glitch filter 81 is connected downstream from output 72 of comparator 71. In the configuration illustrated in subfigure 8A, the prefilter in the form of the RC filter together with resistor R7 and capacitor C7 is used for damping very steep voltage peaks, and has a typical limiting frequency FC which is below resonant frequency FE by a factor of approximately two, in order to damp the high-frequency resonance vibrations. Instead of an RC filter, some other digital filter or a switched capacitor (SC) filter may also be provided.

The following applies for selecting glitch filter time TG of the glitch filter:

$$TG \leq L1 \frac{IG}{|V(\text{hyst\_up}) - V(\text{hyst\_down})|}, \quad (4)$$

where L1 is the line inductance between generator G or rectifier 1 and the jump start assistance point (L1 or BN in FIGS. 2 and 6), IG is the generator current effective at the time of the switching operations (see FIGS. 3 through 5), and |V(hyst_up)−V(hyst_down)| is the voltage difference between the threshold values (see FIGS. 3 through 5, voltage difference ΔU).

The glitch filter, which may be designed in a conventional manner, masks out changes in its input variables when their duration is less than TG.

As depicted in subfigure 8B, the described filter behavior may also be simulated by an A/D conversion with the aid of an A/D converter 83 together with a digital circuit 84 connected downstream therefrom.

Another option for overcoming the described disadvantages of the related art is the adaptive control of the trigger thresholds of comparator 71, which decides on the activation and deactivation of the phase short circuit. Such a method may also be combined with the other specific embodiments as previously described.

For this purpose, for example comparator 71 in FIGS. 7 and 8, designed as a hysteresis element, may be replaced by a comparator having a variable comparator threshold. The schematic curve of the voltage at direct voltage terminal B+ is indicated by reference character V_BP in FIG. 9 for illustration purposes. At the time of the expected voltage peak due to an activation or deactivation of a phase short circuit, detection threshold V(hyst_down) (see FIGS. 3 through 5) for a predefined period of time is lowered to a lower value V_LD_BLANK_L, or detection threshold V(hyst_up) may be raised (likewise see FIGS. 3 through 5). Values V_LD_BLANK_L and V_LD_BLANK_H are definitely not reached by voltage V_BP, which corresponds to a virtual deactivation of the corresponding threshold values. Alternatively, corresponding threshold values may in each case also be masked out (deactivated) in some other way.

In equation 4, |V(hyst_up)−V(hyst_down)| (also referred to as ΔU) may thus be set according to the following criteria:

$$\Delta U \leq V\_LD\_BLANK\_H - V(\text{hyst\_down}) \text{ or}$$

$$\Delta U \leq -V\_LD\_BLANK\_L - V(\text{hyst\_up})$$

In the design of shorter glitch times or in combination with the first specific embodiment described above, the higher extinction voltages ΔU result in the option of increasing the limiting frequency and thus reducing delay times in the response.

Figure 9:
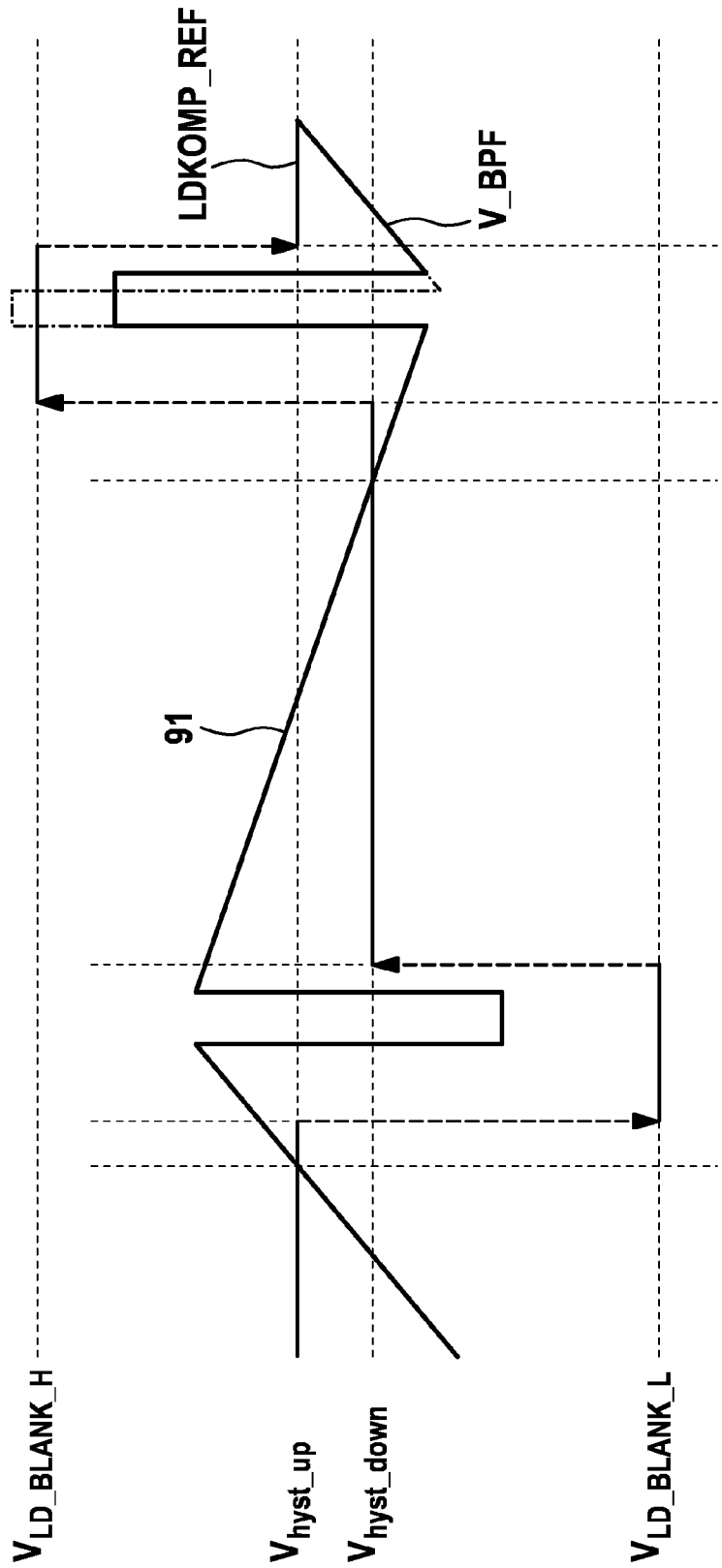
FIG. 9 shows measures for operating a comparator according to one specific embodiment of the present invention, in a schematic illustration.

When the method shown in FIG. 9 is used alone, the described disadvantages in the related art may likewise be avoided by a suitable selection of the values of V_LD_BLANK_L, V_LD_BLANK_H, and the duration of the change in the detection thresholds. For this purpose, V_LD_BLANK_L, V_LD_BLANK_H are to be selected in such a way that peaks of V(B+) no longer result in an undesirable activation and deactivation of the phase short circuit.

What is claimed is:

1. A motor vehicle electrical system, comprising:
   an electric machine;
   an active bridge rectifier;
   at least one control device configured for converting an alternating voltage which is output by the electric machine via a number of phase connections into a direct voltage by controlling active switching elements of the bridge rectifier; and
   an arrangement configured to initiate a short circuit of at least two of the phase connections as soon as a signal characterizing the direct voltage exceeds an upper threshold value, and to deactivate the short circuit as soon as the signal characterizing the direct voltage subsequently falls below a lower threshold value, the arrangement including circuitry and a comparator, wherein:
   the circuitry is arranged to detect a value of the direct voltage, to filter the detected value, and to provide the filtered value as the signal characterizing the direct voltage to the comparator; and
   the comparator
      is configured to compare the signal characterizing the direct voltage to the upper threshold value and to the lower threshold value; and
      is arranged for receiving the upper threshold value and the lower threshold value in a form by which the lower threshold value used by the comparator is lowered or deactivated for a period of time as soon as the signal characterizing the direct voltage exceeds the upper threshold value and the upper threshold value used by the comparator is raised or deactivated for a period of time as soon as the signal characterizing the direct voltage falls below the lower threshold value.

2. The motor vehicle electrical system as recited in claim 1, wherein the circuitry includes at least one of: i) a filter that includes at least one of an RC filter, a glitch filter, and an SC filter, and ii) a system having an A/D converter and a digital circuit connected downstream therefrom which is configured for simulating an appropriate filter behavior.

3. The motor vehicle electrical system as recited in claim 1, wherein the circuitry is configured to filter the detected value of the direct voltage based on at least one resonant frequency of the vehicle electrical system.

4. A method for operating a motor vehicle electrical system which includes an electric machine, an active bridge rectifier, and at least one control device, in which an alternating voltage which is output by the electric machine at a number of phase connections is converted into a direct voltage with the aid of the at least one control device by controlling active switching elements of the bridge rectifier, and a short circuit of at least two of the phase connections is initiated as soon as a signal characterizing the direct voltage exceeds an upper threshold value, and the short circuit is deactivated as soon as the signal characterizing the direct voltage subsequently falls below a lower threshold value, the method comprising:
   detecting a value of the direct voltage;
   filtering the detected value;
   providing the filtered value as the signal characterizing the direct voltage;
   supplying the signal characterizing the direct voltage to a comparator; and
   comparing, by the comparator the signal characterizing the direct voltage to the upper threshold value and to the lower threshold value, the upper threshold value and the lower threshold value being provided in the form of a settable comparator threshold of the comparator by which:
- the lower threshold value is lowered or deactivated for a period of time as soon as the signal characterizing the direct voltage exceeds the upper threshold value; and
- the upper threshold value is raised or deactivated for a period of time as soon as the signal characterizing the direct voltage falls below the lower threshold value.

5. The method as recited in claim 4, further comprising: using the method for operating a motor vehicle electrical system.

6. The method as recited in claim 4, wherein the detected value of the direct voltage is filtered with the aid of at least one filter whose filter parameters are selected, at least in part, based on at least one of capacitance and inductance values of components of the motor vehicle electrical system.

7. A processing unit for operating a motor vehicle electrical system which includes an electric machine, an active bridge rectifier, and at least one control device, in which an alternating voltage which is output by the electric machine at a number of phase connections is converted into a direct voltage with the aid of the at least one control device by controlling active switching elements of the bridge rectifier, and a short circuit of at least two of the phase connections is initiated as soon as a signal characterizing the direct voltage exceeds an upper threshold value, and the short circuit is deactivated as soon as the signal characterizing the direct voltage subsequently falls below a lower threshold value, the processing unit configured to:
- detect a value of the direct voltage;
- filter the detected value;
- provide the filtered value as the signal characterizing the direct voltage;
- compare the signal characterizing the direct voltage to the upper threshold value and to the lower threshold value, the upper threshold value and the lower threshold value being provided in the form of a settable comparator threshold of the comparator; and
- lower or deactivate the lower threshold value for a period of time as soon as the signal characterizing the direct voltage exceeds the upper threshold value, and raise or deactivate the upper threshold value for a period of time as soon as the signal characterizing the direct voltage falls below the lower threshold value.

8. A non-transitory machine-readable memory medium storing a computer program for operating a motor vehicle electrical system which includes an electric machine, an active bridge rectifier, and at least one control device, in which an alternating voltage which is output by the electric machine at a number of phase connections is converted into a direct voltage with the aid of the at least one control device by controlling active switching elements of the bridge rectifier, and a short circuit of at least two of the phase connections is initiated as soon as a signal characterizing the direct voltage exceeds an upper threshold value, and the short circuit is deactivated as soon as the signal characterizing the direct voltage subsequently falls below a lower threshold value, the computer program, when executed by a processing unit, configured to cause:
- detecting a value of the direct voltage;
- filtering the detected value;
- providing the filtered value as the signal characterizing the direct voltage;
- comparing the signal characterizing the direct voltage to the upper threshold value and to the lower threshold value, the upper threshold value and the lower threshold value being provided in the form of a settable comparator threshold of the comparator; and
- lowering or deactivating the lower threshold value for a period of time as soon as the signal characterizing the direct voltage exceeds the upper threshold value, and raising or deactivating the upper threshold value for a period of time as soon as the signal characterizing the direct voltage falls below the lower threshold value.

* * * * *